(12) United States Patent
Raiser et al.

(10) Patent No.: US 7,629,064 B2
(45) Date of Patent: Dec. 8, 2009

(54) MANIFOLD SEALING AND CORROSION PREVENTIVE INTERFACE PLATE FOR A FUEL CELL STACK

(75) Inventors: Stephen Raiser, Egelsbach (DE); Ralf Lerch, Armsheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 363 days.

(21) Appl. No.: 10/847,796

(22) Filed: May 18, 2004

(65) Prior Publication Data

US 2005/0260479 A1    Nov. 24, 2005

(51) Int. Cl.
*H01M 8/04* (2006.01)
(52) U.S. Cl. .............................. 429/13; 429/34; 429/35; 429/36; 429/38; 429/39
(58) Field of Classification Search ..................... 429/35
See application file for complete search history.

(56) References Cited

U.S. PATENT DOCUMENTS

| | | | |
|---|---|---|---|
| 5,514,487 A * | 5/1996 | Washington et al. | 429/39 |
| 6,942,941 B2 * | 9/2005 | Blunk et al. | 429/36 |
| 2001/0018143 A1 * | 8/2001 | Okazaki | 429/32 |
| 2001/0021470 A1 * | 9/2001 | May et al. | 429/44 |
| 2002/0058177 A1 * | 5/2002 | Nishiyama et al. | 429/35 |
| 2003/0152819 A1 * | 8/2003 | Hatoh et al. | 429/32 |

FOREIGN PATENT DOCUMENTS

| | | | |
|---|---|---|---|
| EP | 0981175 A2 * | 2/2000 |
| JP | 08-130028 | * | 5/1996 |
| JP | 2003-163026 | * | 6/2003 |

* cited by examiner

*Primary Examiner*—Jonathan Crepeau
*Assistant Examiner*—Tony Chuo
(74) *Attorney, Agent, or Firm*—Harness, Dickey & Pierce, P.L.C.

(57) ABSTRACT

A fuel cell assembly having a terminal plate that is isolated from fluid flows passing to the fuel cell stack through manifolds is provided. A corrosion resistant member is positioned between the fuel cell stack and the terminal plate and sealingly engages with the manifold. The sealing engagement between the manifold and the corrosion resistant member prevents fluid flowing through the manifold to the fuel cell stack from contacting the terminal plate. Thus, a fuel cell assembly according to the present invention can be operated while preventing a fluid flow through the manifold from contacting the terminal plate.

20 Claims, 2 Drawing Sheets

US 7,629,064 B2

MANIFOLD SEALING AND CORROSION PREVENTIVE INTERFACE PLATE FOR A FUEL CELL STACK

FIELD OF THE INVENTION

The present invention relates to fuel cells and, more particularly, to manifold sealing within a fuel cell stack to avoid corrosion.

BACKGROUND OF THE INVENTION

Fuel cells have been used as a power source in many applications. A typical fuel cell stack is comprised of a plurality of individual fuel cells stacked one upon the other and held in compression with respect to each other. Typically, each fuel cell comprises an anode layer, a cathode layer, and an electrolyte interposed between the anode layer and the cathode layer. The fuel cell stack requires a significant amount of compressive force to squeeze the fuel cells of the stack together. The need for the compressive force comes about from the internal gas pressure of the reactants within the fuel cells plus the need to maintain good electrical contact between the internal components of the cells.

To apply the compressive force, the fuel cell stack is positioned between a pair of rigid endplates that are held in a fixed space relation to maintain a compressive force on the fuel cell stack. Electrically conductive terminal plates are disposed between the endplates and the fuel cell stack and are used to conduct electrical current between the fuel cell stack and the system in which the fuel cell assembly is employed. The fuel cell stack requires gaseous reactants (anode reactant and cathode reactant) to be supplied to and from the fuel cell stack to produce electricity. A coolant flow is also provided to and from the fuel cell stack to keep the stack at a desired operating temperature. These gaseous reactants and coolant can be humid flows and are supplied to the fuel cell stack by manifolds. The manifolds pass through one of the endplates and are sealed against the terminal plate. The gaseous reactants and coolant can then be supplied to the fuel cell stack via the manifolds. Because the seal area is against the terminal plate, the humid fluids (gaseous reactants and/or coolant) are in contact with the terminal plate. Ambient conditions and the voltage (electrical potential), which is applied to the terminal plates, create electrolysis and causes corrosion of the terminal plate. Corrosion of the terminal plate is undesirable because it could decrease the lifespan of the fuel cell assembly and also contaminate the feed streams being supplied to the fuel cell stack through the manifolds. Corrosion is most prevalent in the terminal plate at the location of contact with the coolant flow.

The terminal plates are made from a good conductor, (e.g., aluminum) to facilitate the current flow between the fuel cell stack and the system in which the fuel cell assembly is employed. To protect the terminal plates against corrosion, various coatings have been used on the terminal plate. The coatings to inhibit corrosion, however, can be expensive and cost prohibitive (e.g., made of gold). Additionally, the coatings can have a limited lifespan such that the life of the fuel cell assembly is reduced even with the use of the coatings. Furthermore, the coatings can be very sensitive to minor damage, such as scratches, and result in poor performance or allowing the corrosion process to occur. Thus, an inexpensive way to inhibit and/or prevent corrosion of a terminal plate is desirable.

SUMMARY OF THE INVENTION

The present invention provides a fuel cell assembly with terminal plates that are protected from corrosion and/or the corrosion process is inhibited. The present invention also provides a method for making a fuel cell assembly that inhibits and/or prevents corrosion of the terminal plate along with a method of operating the same.

In a first aspect according to the principles of the present invention, a fuel cell assembly is disclosed. The fuel cell assembly includes a plurality of fuel cells arranged adjacent one another to form a fuel cell stack. There is a terminal plate that is operable to conduct electrical current to and from the fuel cell stack. The terminal plate has an opening for transport of a fluid to or from the fuel cell stack. A corrosion resistant member is disposed between at least a portion of the terminal plate and at least a portion of the fuel cell stack. The corrosion resistant member is electrically conducting and conducts current between the fuel cell stack and the terminal plate. The corrosion resistant member defines a passage to conduct the fluid to or from the fuel cell stack. There is also a manifold with a channel to conduct the fluid to or from the passage. The channel of the manifold and the passage of the corrosion resistant member prevent the fluid from contacting the terminal plate when being supplied through the opening of the terminal plate.

In another aspect according to the principles of the present invention, a method of operating a fuel cell assembly having a fuel cell stack, a terminal plate, and a manifold is disclosed. The method includes: (1) supplying coolant to the fuel cell stack through the terminal plate via the manifold by passing the coolant through a corrosion resistant member positioned between at least a portion of the terminal plate and at least a portion of an end of the fuel cell stack; (2) preventing the coolant from contacting the terminal plate by providing a continuous flow path from the manifold to the fuel cell stack through the terminal plate; and (3) extracting current from the fuel cell stack through the terminal plate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments are merely exemplary in nature and is in no way intended to limit the invention, its application, or uses.

Figure 1:
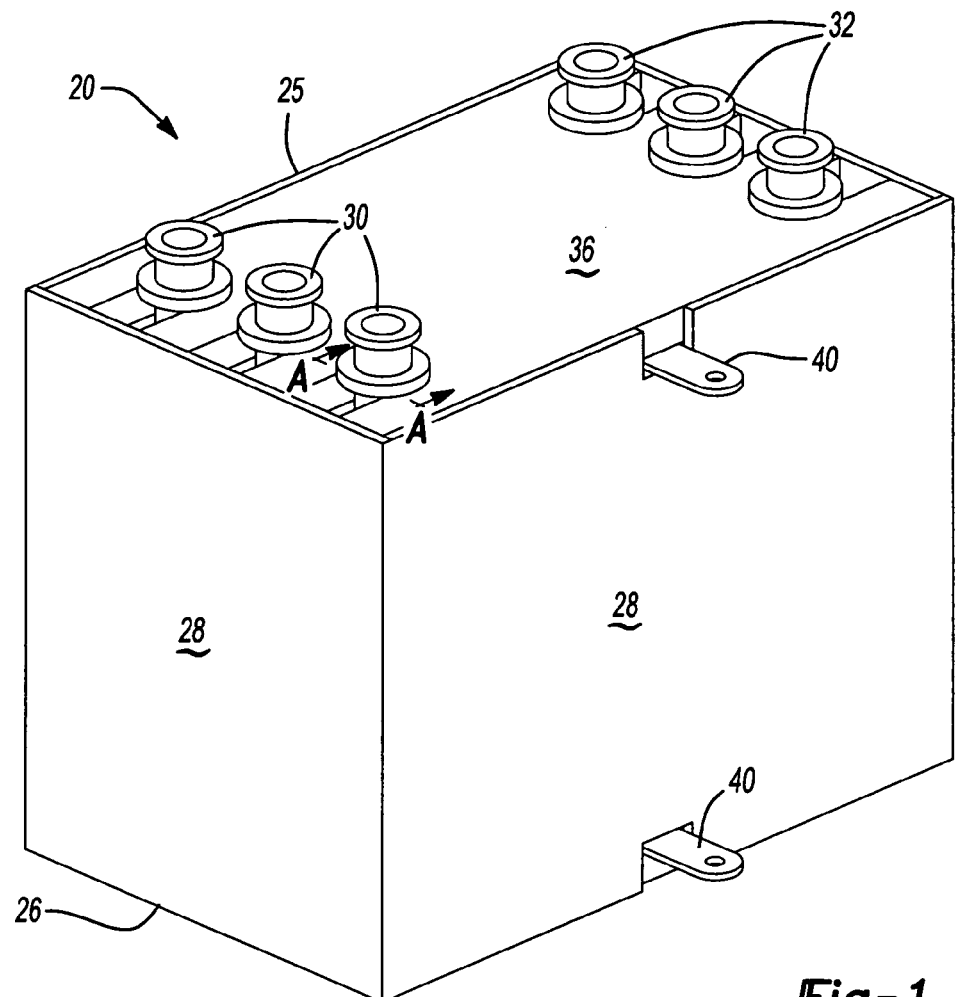
FIG. 1 is a simplified perspective view of a fuel cell assembly according to the principles of the present invention.

Referring to FIG. 1, there is shown a fuel cell assembly 20 according to the principles of the present invention. Fuel cell assembly 20 includes a plurality of fuel cells 22 (FIG. 3) arranged in a stacked configuration to form a fuel cell stack 24. The fuel cell stack 24 is interposed between upper and lower ends 25 and 26. At upper end 25 there is an assembly 27. The ends 25 and 26 are held in a fixed space relation by one or more side plates 28. The side plates 28 hold the upper and lower ends 25 and 26 in a spaced relation so that a compressive force is imparted on fuel cell stack 24. Other methods of imparting a compressive force, however, can be employed without departing from the scope of the present invention. Fuel cell assembly 20 includes inlet manifolds 30, outlet manifolds 32, and passageways 34 for supplying and exhausting reactant and coolant fluid streams to/from fuel cell stack 24.

Figure 2:
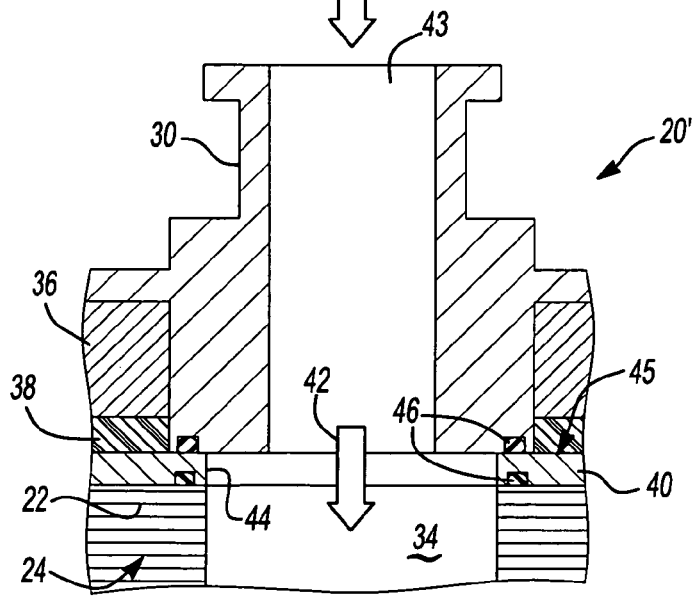
FIG. 2 is a partial cross-sectional view of a prior art fuel cell assembly showing the sealing of a manifold to a terminal plate.
Figure 3A:
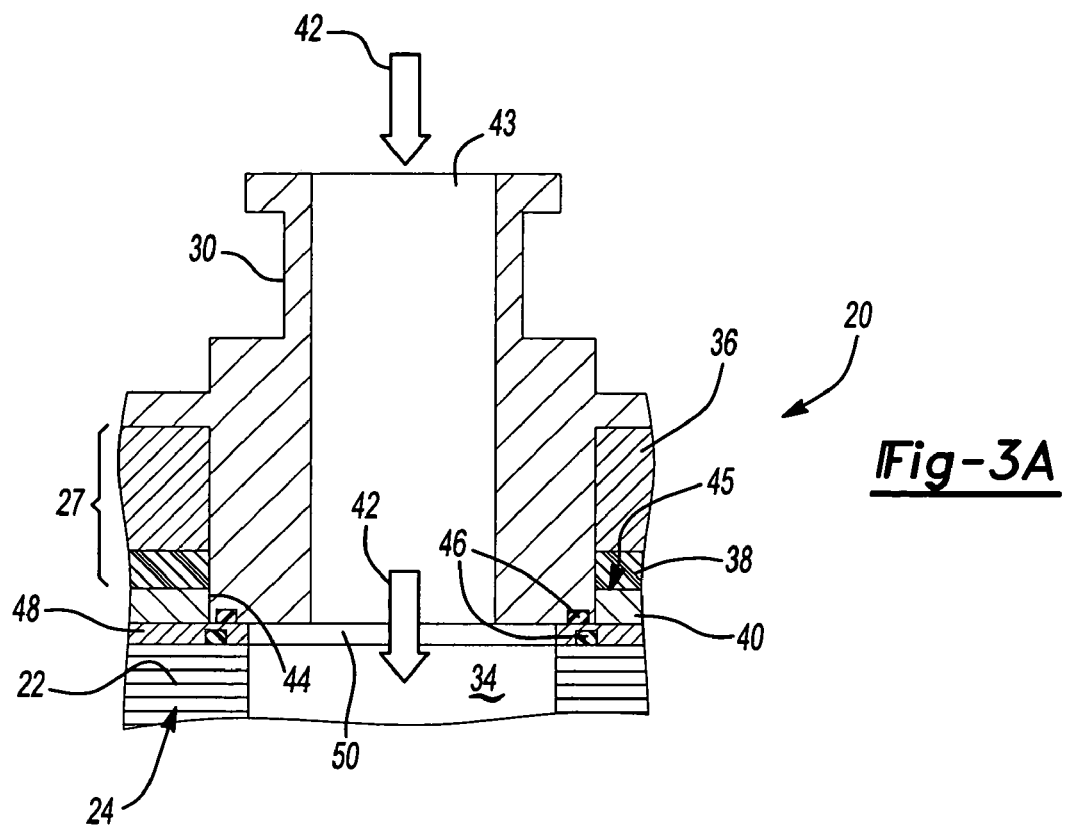
FIGS. 3A-B are partial cross-sectional views of the fuel cell assembly of FIG. 1, taken along line A-A, showing two different embodiments of a fuel cell assembly according to the principles of the present invention.
Figure 3B:
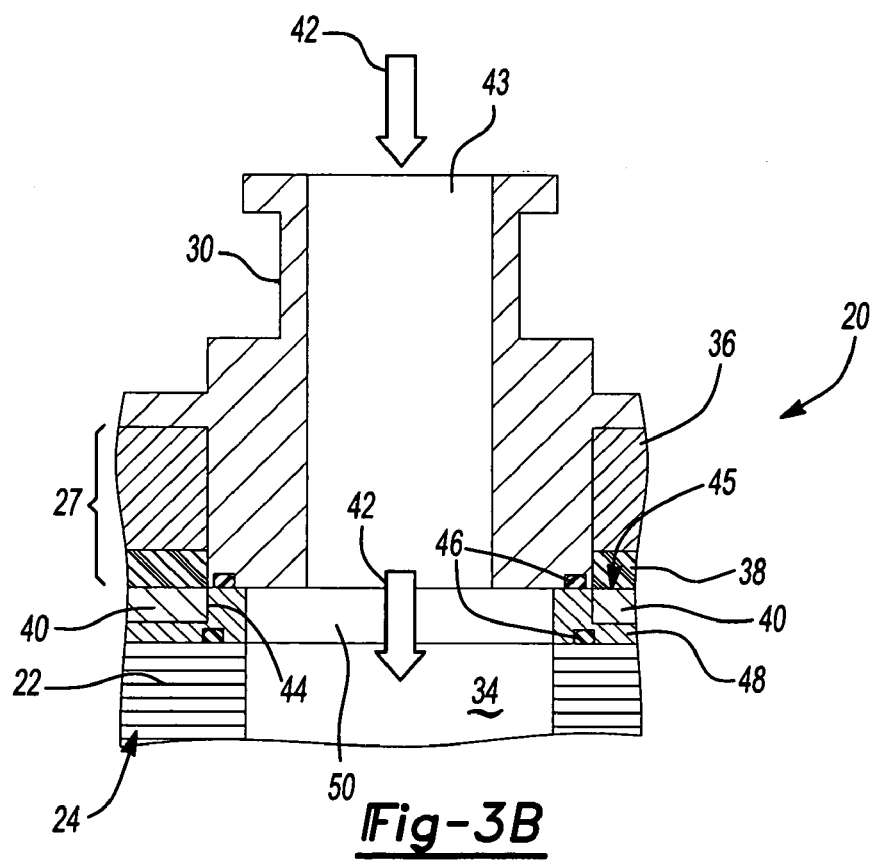

Referring now to FIGS. 2 and 3A-B, a portion of fuel cell stack 24, upper end assembly 27, an inlet manifold 30 and a passageway 34 are shown. As can be seen, upper end assembly 27 includes an endplate 36 and an isolator plate 38 through which inlet manifold 30 passes. A terminal plate 40 is positioned between isolator plate 38 and an end of fuel cell stack 24. A second terminal plate 40 is positioned adjacent an opposite end of fuel cell stack 24. Terminal plate 40 conducts electrical current to/from fuel cell stack 24. Accordingly, terminal plate 40 is made from a highly conductive material capable of handling the current densities that will be encountered in the production of electricity by fuel cell assembly 20. For example, terminal plate 40 can be made from aluminum and capable of handling a current density of about 8 $A/mm^2$ or greater depending upon the specific configuration and power output of fuel cell assembly 20. Isolator plate 38 serves to isolate endplate 36 from terminal plate 40 so that electrical current flowing to/from fuel cell stack 24 does not flow through endplate 36. Accordingly, isolator plate 38 is made from a non-electrically conductive material. Inlet manifold 30 is electrically non-conductive to prevent electrical current flowing to/from fuel cell stack 24 from flowing through inlet manifold 30. Accordingly, inlet manifold 30 is made from a non-electrically conductive material. For example, inlet manifold 30 can be made from plastic, ceramic or a metal with a non-conductive coating.

As can be seen, a fluid flow 42 flowing to fuel cell stack 24 via a channel 43 in inlet manifold 30 flows through endplate 36, isolator plate 38 and through an opening 44 in terminal plate 40 prior to reaching fuel cell stack 24. In typical prior art fuel cell assemblies 20', as shown in FIG. 2, inlet manifold 30 sealingly engages with a first side 45 of terminal plate 40. Inlet manifold 30 can be sealed to terminal plate 40 in a variety of ways. For example, a sealing member 46 can be positioned between inlet manifold 30 and terminal plate 40. Sealing member 46 prevents fluid flow 42 from traveling along first side 45 of terminal plate 40 between inlet manifold 30 and terminal plate 40. The sealing engagement between inlet manifold 30 and first side 45 of terminal plate 40 allows fluid flow 42 to come in contact with terminal plate 40. As was stated above, the humid fluid flow 42 in conjunction with the voltage (electrical potential) in terminal plate 40 creates electrolysis and corrosion of terminal plate 40 at the location of the contact between fluid flow 42 and terminal plate 40.

In accordance with the principles of the present invention, fuel cell assembly 20, as shown in FIGS. 3A-B, incorporates a corrosion resistant member 48 between fuel cell stack 24 and terminal plate 40. Corrosion resistant member 48 defines a passage 50 between manifold 30 and fuel cell stack 24 through which fluid flow 42 flows. In a fuel cell assembly 20 according to the principles of the present invention, inlet manifold 30 sealingly engages with corrosion resistant member 48 instead of with terminal plate 40, as is done in the prior art. The sealing engagement between inlet manifold 30 and corrosion resistant member 48 prevents fluid flow 42 from contacting terminal plate 40. Because fluid flow 42 does not contact terminal plate 40, fluid flow 42 in conjunction with the voltage (electrical potential) in terminal plate 40 do not cause terminal plate 40 to corrode. Thus, fuel cell assembly 20 according to the principles of the present invention has a terminal plate 40 that is not in contact with fluid flow 42.

Corrosion resistant member 48 is in contact with fluid flow 42 and also conducts electrical current between fuel cell stack 24 and terminal plate 40. Accordingly, corrosion resistant member 48 is made from a material that will not corrode in the presence of voltage (electrical potential) and the humid fluid flow 42. Corrosion resistant member 48, however, does not need to be as high a grade electrical conductor as terminal plate 40. For example, corrosion resistant member 48 can be a low grade electrical conductor. Preferably, corrosion resistant member 48 is capable of conducting electricity at a current density of about 1 $A/mm^2$ or greater. Additionally, corrosion resistant member 48 is also made from a material that can withstand the compressive forces experienced within a fuel cell assembly 20. There are a variety of materials that possess these required properties and are suitable for use in making corrosion resistant member 48. For example, materials out of which corrosion resistant member 48 can be made include, but are not limited to, stainless steel, titanium, and graphite.

Referring now to FIG. 3A, a first preferred embodiment of fuel cell assembly 20 is shown. In this embodiment, a portion of inlet manifold 30 extends through opening 44 in terminal plate 40 and sealingly engages with corrosion resistant member 48 to prevent fluid flow 42 from contacting terminal plate 40. In a second preferred embodiment according to the principles of the present invention, as shown in FIG. 3B, a portion of corrosion resistant member 48 extends through opening 44 in terminal plate 40. Inlet manifold 30 sealingly engages with the portion of corrosion resistant member 48 that passes through opening 44 in terminal plate 40 to prevent fluid flow 42 from contacting terminal plate 40. The sealing engagement between inlet manifold 30 and corrosion resistant member 48 can be provided in a variety of ways. For example, a sealing member 46 can be positioned between inlet manifold 30 and corrosion resistant member 48 to seal inlet manifold 30 to corrosion resistant member 48. Sealing member 46 can take a variety of forms including, but not limited to, a gasket, an injection molded seal, such as an O-ring, or an adhesive.

A sealing member 46 can also be employed between corrosion resistant member 48 and the end of fuel cell stack 24 to seal corrosion resistant member 48 to the end of fuel cell stack 24. Alternatively, corrosion resistant member 48 can be attached to the end of fuel cell stack 24 to form a unitary construction with the fuel cell stack 24. For example, corrosion resistant member 48 can be attached to the end of fuel cell stack 24 by brazing, laser welding, cold welding (due to the high compressive forces within fuel cell assembly 20), and/or an electrically conductive adhesive, such as an epoxy mixed with a conductive metallic powder. Attachment of corrosion resistant member 48 to the end of fuel cell stack 24 by these methods ensures a good electrical contact between fuel cell stack 24 and corrosion resistant member 48.

Corrosion resistant member 48 can, alternatively, be attached to terminal plate 40. Corrosion resistant member 48 can be attached to terminal plate 40 in a variety of ways, including, but not limited to, brazing, laser welding, cold welding (due to the high compressive forces within fuel cell assembly 20), and/or an electrically conductive adhesive, such as an epoxy mixed with an electrically conductive metallic powder. Attaching corrosion resistant member 48 to terminal plate 40 ensures good electrical contact between corrosion resistant member 48 and terminal plate 40.

Thus, the present invention provides a fuel cell assembly 20 having a terminal plate 40 that does not come in contact with fluids being supplied to fuel cell stack 24 via manifolds 30 and 32. To accomplish this, a low cost corrosion resistant member 48 sealingly engages with manifolds 30 and 32 to prevent fluid flow 42 from contacting terminal plate 40. The present invention provides an optimum use of material capabilities by providing a terminal plate 40 having good electrical conductivity in the high current area and a corrosion resistant member 48 having good corrosion resistance in a humid fluid area with, optionally, lower electrical conductivity in a lower current area. The present invention provides for simple axial mounting of manifolds 30 and 32 with low radial tolerance requirements. Furthermore, corrosion resistant member 48 is capable of being manufactured from sheet material with a stamping process thus providing a low cost corrosion resistant member 48.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell assembly comprising:
   a pair of end plates;
   a plurality of fuel cells arranged adjacent one another to form a fuel cell stack disposed between said end plates;
   a terminal plate operable to conduct electrical current from said fuel cell stack and having an opening for transport of a fluid to or from said stack;
   a corrosion resistant member disposed between at least a portion of said terminal plate and at least a portion of said fuel cell stack, said corrosion resistant member conducting electrical current between said fuel cell stack and said terminal plate and defining a passage to conduct said fluid to or from said stack;
   a manifold member extending through one of said end plates, said manifold member having first and second ends with a peripheral exterior surface extending therebetween, said manifold member having a channel extending between said first and second ends to conduct said fluid to or from said passage, and said manifold member being distinct and separate from said end plates, said terminal plate and said corrosion resistant member; and
   wherein said channel of said manifold member and said passage of said corrosion resistant member prevent said fluid from contacting said terminal plate when being supplied through said opening of said terminal plate and a portion of said corrosion resistant member extends entirely through said opening in said terminal plate and is sealed against said manifold member.

2. The fuel cell assembly of claim 1, wherein said manifold member is sealed to said corrosion resistant member thereby preventing said fluid from contacting said terminal plate.

3. The fuel cell assembly of claim 2, further comprising a sealing member disposed between said manifold member and said corrosion resistant member, said sealing member sealing said manifold member to said corrosion resistant member and preventing said fluid from contacting said terminal plate.

4. The fuel cell assembly of claim 3, wherein said sealing member is at least one of a gasket, an injection molded seal, and an adhesive.

5. The fuel cell assembly of claim 1, wherein said corrosion resistant member is fixedly attached to said terminal plate.

6. The fuel cell assembly of claim 5, wherein said corrosion resistant member is fixedly attached to said terminal plate by at least one of brazing, laser welding, cold welding, and an electrically conductive adhesive.

7. The fuel cell assembly of claim 1, wherein said corrosion resistant member is fixedly attached to an end of said fuel cell stack.

8. The fuel cell assembly of claim 7, wherein said corrosion resistant member is fixedly attached to said end of said fuel cell stack by at least one of brazing, laser welding, cold welding, and an electrically conductive adhesive.

9. The fuel cell assembly of claim 1, wherein said corrosion resistant member is a distinct member from said terminal plate and passes entirely through said opening in said terminal plate and seals to said manifold member.

10. The fuel cell assembly of claim 1, wherein said corrosion resistant member is made from at least one of stainless steel, titanium, and graphite.

11. The fuel cell assembly of claim 1, wherein said passage is a coolant passage.

12. The fuel cell assembly of claim 1, wherein said passage is an anode reactant passage.

13. The fuel cell assembly of claim 1, wherein said passage is a cathode reactant passage.

14. The fuel cell assembly of claim 1, wherein said corrosion resistant member is a component distinct and separate from said fuel cell stack.

15. A method of operating a fuel cell assembly having a fuel cell stack, a terminal plate, and a manifold member distinct and separate from the fuel cell stack and the terminal plate, the method comprising:
   (a) supplying a fluid to the fuel cell stack through the terminal plate via the manifold member by passing said fluid through a corrosion resistant member positioned between at least a portion of the terminal plate and at least a portion of an end of the fuel cell stack, said manifold member extending through a separate and distinct end plate of the fuel cell stack;
   (b) preventing said fluid from contacting the terminal plate by providing a continuous flow path from the manifold member to the fuel cell stack through the terminal plate; and
   (c) extracting current from the fuel cell stack through the terminal plate,
   wherein (b) further comprises sealing the manifold member to a portion of said corrosion resistant member that passes entirely through an opening in the terminal plate that forms the flow path, said corrosion resistant member being a distinct member from said terminal plate.

16. The method of claim 15, wherein (b) further comprises sealing the manifold member to said corrosion resistant member preventing said fluid from contacting the terminal plate.

17. The method of claim 16, wherein (b) further comprises fixedly attaching said corrosion resistant member to an end of the fuel cell stack.

18. The method of claim 16, wherein (b) further comprises fixedly attaching said corrosion resistant member to the terminal plate.

19. The method of claim 16, wherein (b) further comprises sealing the manifold member to said corrosion resistant member by at least one of a gasket, an injection molded seal and an adhesive.

20. A fuel cell assembly comprising:
- a plurality of fuel cells arranged adjacent one another to form a fuel cell stack;
- a terminal plate operable to conduct electrical current from said fuel cell stack and having an opening for transport of a fluid to or from said stack;
- a corrosion resistant member distinct from said terminal plate and disposed between at least a portion of said terminal plate and at least a portion of said fuel cell stack, said corrosion resistant member conducting electrical current between said fuel cell stack and said terminal plate and defining a passage to conduct said fluid to or from said stack;
- a manifold member having first and second ends with a peripheral exterior surface extending therebetween and with an interior channel extending between said first and second ends to conduct said fluid to or from said passage, said manifold member being distinct and separate from said terminal plate and said corrosion resistant member: and
- wherein at least a portion of said corrosion resistant member extends entirely through said opening in said terminal plate and seals against said manifold member thereby preventing said fluid from contacting said terminal plate when flowing through said opening of said terminal plate.

* * * * *